United States Patent
Soenkens et al.

(10) Patent No.: US 11,748,275 B2
(45) Date of Patent: Sep. 5, 2023

(54) METHOD FOR SECURELY UPDATING CONTROL UNITS

(71) Applicant: Robert Bosch GmbH, Stuttgart (DE)

(72) Inventors: Andreas Soenkens, Remseck Am Neckar (DE); Bjoern Kasper, Pleidelsheim (DE); Jens Schmuelling, Ludwigsburg (DE); Thorsten Schwepp, Korb (DE)

(73) Assignee: ROBERT BOSCH GMBH, Stuttgart (DE)

( * ) Notice: Subject to any disclaimer, the term of this patent is extended or adjusted under 35 U.S.C. 154(b) by 86 days.

(21) Appl. No.: 17/356,922

(22) Filed: Jun. 24, 2021

(65) Prior Publication Data
US 2021/0406361 A1 Dec. 30, 2021

(30) Foreign Application Priority Data
Jun. 25, 2020 (DE) .......................... 102020207862.9

(51) Int. Cl.
| | |
|---|---|
| G06F 12/14 | (2006.01) |
| G06F 21/44 | (2013.01) |
| G06F 21/60 | (2013.01) |
| G06F 21/72 | (2013.01) |

(52) U.S. Cl.
CPC ........ *G06F 12/1458* (2013.01); *G06F 21/445* (2013.01); *G06F 21/604* (2013.01); *G06F 21/72* (2013.01); *G06F 2221/2103* (2013.01)

(58) Field of Classification Search
CPC ....... G06F 12/14; G06F 12/1458–1491; G06F 21/30–45; G06F 21/60; G06F 21/604; G06F 21/62–6281; G06F 21/71–72; G06F 21/78–805; G06F 2221/2103
See application file for complete search history.

(56) References Cited

U.S. PATENT DOCUMENTS

| | | | | |
|---|---|---|---|---|
| 2006/0143600 | A1* | 6/2006 | Cottrell | G06F 21/572 717/168 |
| 2016/0344705 | A1* | 11/2016 | Stumpf | H04L 9/3213 |
| 2021/0263746 | A1* | 8/2021 | Thom | G06F 21/572 |

FOREIGN PATENT DOCUMENTS

| | | |
|---|---|---|
| DE | 102015209116 A1 | 11/2016 |
| DE | 112017004311 T5 | 5/2019 |
| EP | 3232602 A1 | 10/2017 |

* cited by examiner

*Primary Examiner* — Kevin Bechtel
(74) *Attorney, Agent, or Firm* — NORTON ROSE FULBRIGHT US LLP; Gerard Messina

(57) ABSTRACT

A method for securely updating a control unit. The control unit includes a host configured to execute an update program and at least one application program, a memory, which contains the programs and data, and a hardware security module (HSM) which is configured to block and to unblock a write access to the memory. The method includes starting the host and the HSM; blocking the write access by the HSM; starting the update program; determining by the update program whether a request of a caller to carry out an update is present; if a request is present, checking an authorization of the caller by the HSM to carry out an update, the authorization of the caller being confirmed by a confirmation unit differing from the control unit; and if the caller is authorized, unblocking the write access and rewriting at least a portion of the memory by the update program.

13 Claims, 3 Drawing Sheets

METHOD FOR SECURELY UPDATING CONTROL UNITS

CROSS REFERENCE

The present application claims the benefit under 35 U.S.C. § 119 of German Patent Application No DE 102020207862.9 filed on Jun. 25, 2020, which is expressly incorporated herein by reference in its entirety.

FIELD

The present invention relates to a method for securely updating a control unit as well as to a processing unit and to a computer program for carrying out the method.

BACKGROUND INFORMATION

Programmable control units are used in machines and vehicles in order to control these or also components thereof. For example, a vehicle may contain control units for engine control, for the braking system, etc. The control units include a processor including one or, typically including multiple processor cores (also simply referred to as host or host system), which executes programs stored in a memory in order to achieve the control functions of the control unit. Manufacturers of machines or vehicles usually reprogram the control units used therein during the production of a machine or of a vehicle with manufacturer-specific application programs. Due to the longevity of modern machines and vehicles, the control function of control units must also be adaptable to changing demands. Thus, it must be possible to carry out an update or re-programming of the control units, i.e., the data and programs stored in the memory should be able to be changed.

For safety reasons, application software or data, which are stored in the memory of the control unit or of a local microprocessor or microcontroller must be prevented from being changed in an unauthorized manner. For this purpose, a password-based write protection may be used for the memory, which may be removed and activated via hardware. Only when the memory protection has been removed after input of the password, is the memory of the control unit able to be changed or rewritten, for example, is a new software or other data able to be uploaded into the memory. The password is generated individually for each control unit and administered by a so-called hardware security module, HSM, which stores the password in a memory area provided therefor. If an update is to be carried out, the password is requested from the hardware security module and checked by the person or the application that intends to carry out an update or change of the stored software or data, or a programming device used by the person for such purpose. A further protection of the update or reprogramming process of a control unit is usually not provided.

SUMMARY

According to an example embodiment of the present invention, a method for securely updating a control unit as well as a processing unit and a computer program for carrying out the method are provided. Advantageous embodiments of the present invention are disclosed herein.

According to the present invention, the removal of the write protection of the memory is blocked by the hardware security module until a separate check of the authorization of the caller, who calls up an update function of the control unit, i.e., who requests an update to be carried out, is successfully completed. The authorization of the caller in this case is confirmed by a confirmation unit separate or different from the control unit, in particular, vehicle-external.

Only when it is established during the check of the authorization that the caller is authorized, are the write access and a rewriting of at least a portion of the memory by the update program unblocked by the HSM. An enhanced protection of the application software of the control unit against manipulations is thereby achieved.

In accordance with an example embodiment of the present invention, when checking the authorization, the HSM communicates advantageously directly or indirectly with the (external) confirmation unit. Since the authorization of the caller is confirmed by a third body, the authorization may be centrally assigned and/or revoked at this third body. This enables the simple assignment or withdrawal of an authorization, in particular, if a caller is to be authorized to update multiple control units (for example, an automobile repair shop, in which the control units of all motor vehicles of an automobile manufacturer are updated). The individual control units or their respective HSM require no inherent knowledge of the assignment or withdrawal of the authorization. The confirmation unit may be a single unit (for example, a server of an automobile manufacturer in the case of control units for motor vehicles, for example, so-called Key-Management System) or also formed in a distributed system (for example, in the form of a Public Key Infrastructure (PKI) or a block chain). The confirmation unit stores, for example, code words or cryptographic keys, which are used in the authorization check. The confirmation unit is, in particular, responsible for multiple HSM or control units, in particular, also for multiple machines or vehicles.

The host or the host system includes a processor, which is configured to execute software or computer programs (referred to simply as programs), in order to implement functions of the control unit. The host may include further elements such as, for example, a working memory (for example, a direct access memory, random access memory, RAM), communication interfaces, in particular, for communication with the memory, with the HSM and with external devices and/or the like. The software is contained or stored in the memory, which is non-volatile, for example, in a flash memory, a hard disk or an SSD (solid state disk). The memory of the control unit is re-writable. The term "memory" is understood to mean the memory of the control unit, unless noted otherwise. The software may include, on the one hand, at least one application program, which serves to implement control functions of the control unit when it is executed by the host and, on the other hand, an update program (programming software), which serves, among other things, to rewrite the memory or parts thereof with software (program data) or data when it is executed by the host. This means, the control unit may be updated or reprogrammed with the aid of the update program, which represents basically a programming software for reprogramming the control unit. The update may relate to programs, whose sequence determines the function of the control unit, and/or data, which are required for the function of the control unit, for example, initialization parameters or program parameters. When updating or reprogramming, the memory or memory areas are entirely or partially rewritten with update data (new programs, i.e., software, and/or other new data). The update program may optionally, if necessary, carry out further actions, for example, determining which programs/data must be updated, or prompt a restart of the control unit after the update.

In accordance with an example embodiment of the present invention, the hardware security module, referred to in short as HSM, provides cryptographic functions, which may be utilized by the host in order to secure safety critical functions, for example, the communication of multiple control units among one another. For this purpose, the HSM maintains, in particular, secret passwords (code words), cryptographic keys and implements cryptographic methods preferably in hardware. These keys are stored by the HSM, in an area of the memory provided therefor and/or stored in an HSM memory, i.e., in a dedicated memory of the HSM. The HSM includes a processor (which differs from the host processor) and may be executed separately from the host or may be integrated with the host or host processor and the memory in one chip (HSM and host are then formed basically by different processor cores on the chip). The HSM is configured to provide a write protection for the memory, i.e., to block or unblock a write access to the memory. Only when the write access is unblocked is it possible to carry out an update, which requires a rewriting of the memory. The HSM may further be configured to check the integrity of memory areas in order to check the authenticity of computer programs contained in the respective memory area or of software and/or data contained therein.

In accordance with an example embodiment of the present invention, the caller is the person and/or the device, who or which intends to carry out the update and presents a corresponding query to the control unit or to the update program, i.e., who or which calls up an update function of the control unit. The caller may be a person and/or a device. The caller may, for example, be a person in the form of an operator, who updates a control unit of a machine. The operator may use a device for this purpose, i.e., the caller encompasses a person and a device. During the manufacture of a control unit or during installation of the control unit in a machine (for example, in a motor vehicle), an automatic update of control units by a production machine, i.e., by a device, may take place.

The check of the authorization may preferably include a challenge-response authentication. During the challenge-response authentication, the challenge is further preferably posed by the HSM and the response to the challenge is provided by the confirmation unit. In the process, the challenge (i.e., a question) originating from the HSM is directed via the host and the caller to the confirmation unit and the response originating from the confirmation unit is directed via the caller and the host to the HSM. This takes place preferably—but not necessarily—in an encrypted or cryptologically secured manner.

According to these embodiments of the method in accordance with the present invention, it is possible to achieve a secure safekeeping of the secret (which is device-specifically generated) required for the challenge-response authentication at one location, without having to be known by every potential caller.

During the challenge-response authentication, the caller proves its authorization preferably with respect to the confirmation unit. The proof of authorization with respect to the confirmation unit may take place using a hardware token, for example, a smartcard, with the aid of a digital certificate stored thereon.

In accordance with an example embodiment of the present invention, the method may further include, after the start of the update program if no query is present, an execution of at least one of the one or of the multiple application programs by the host. If no update is to be carried out, the actual function of the control unit is started without a time delay as a result.

The method preferably includes a blocking of the write access by the HSM after the reprogramming and subsequent execution of at least one of the one or of the multiple application programs by the host, if it is established during the check of authorization that the caller is authorized. The renewed blocking of the write access to the memory of the update may ensure that the memory is not manipulated after the update, for example, by an application program or also from outside the control unit with the aid of an access via a communication interface.

The method may preferably further include a request and check of a password before the write access is unblocked. This serves to incorporate an additional protection before unblocking the write access.

The method further preferably includes stopping the host and/or sending or outputting an error message if it is established that the caller is not authorized. This may prevent a potentially manipulated control unit from running further and from potentially erroneously executing safety-critical functions. The error message may be output to a user. It is equally possible to forward the error message to one or to multiple other control units. For example, motor vehicles include a multitude of control units; if one of these, for example, a control unit for the braking system, establishes with the aid of a failed authorization check a possible manipulation attempt, this control unit may output or send a corresponding error message to other control units, so that these respond thereto, for example, are unable to start or stop; for example, an engine control unit could stop the engine if the control unit of the braking system reports a potential manipulation attempt.

A processing unit according to the present invention, for example, a control unit of a motor vehicle is, in particular, programmatically configured to carry out a method according to the present invention.

The implementation of a method according to the present invention in the form of a computer program or computer program product including program code for carrying out all method steps is also advantageous, since this generates particularly low costs, in particular, if an executing control unit is also utilized for further tasks and is therefore already present.

Suitable data media for providing the computer program are, in particular, magnetic, optical and electrical memories such as, for example, hard disks, flash memories, EEPROMs, DVDs and the like. A download of a program via computer networks (Internet, Intranet, etc.) is also possible.

Further advantages and embodiments of the present invention result from the description and the figures.

The present invention is schematically represented in the figures based on exemplary embodiments and is described below with reference to the figures.

DETAILED DESCRIPTION OF EXAMPLE EMBODIMENTS

Figure 1:
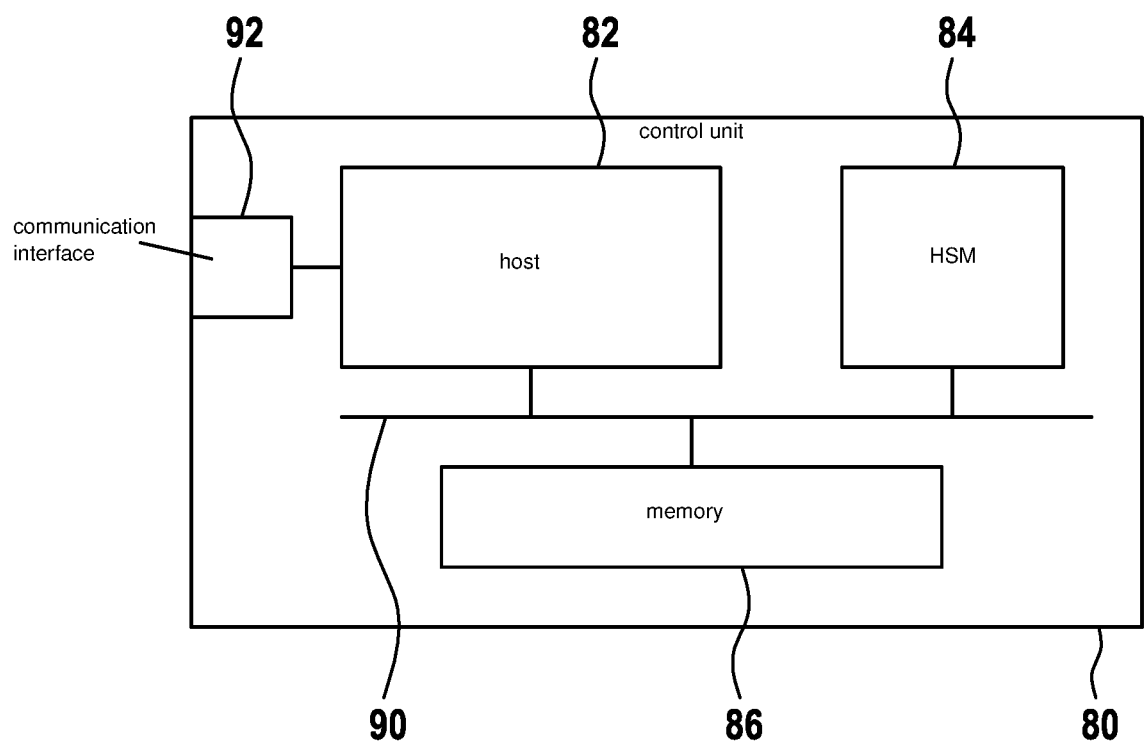
FIG. 1 shows the basic setup of a control unit on which the present invention may be based.

FIG. 1 shows the basic setup of a control unit or of a processing unit contained in a control unit, on which the present invention may be based. In this case, essentially only those components are shown, which are necessary for understanding the present invention.

Control unit 80 includes a host 82, a hardware security module (HSM) 84 and a memory 86. These are interconnected with the aid of one or of multiple connections or lines for exchanging data. In the figure, this occurs, for example, via a bus 90.

For the sake of completeness, a communication interface 92 is also shown, which serves to connect control unit 80 to other devices. These may be, in particular a device to be controlled by the control unit and/or other control units. A programming device, with which an update of the control device is to be carried out, may also communicate with the control unit via communication interface 92. Communication interface 92 may, for example, include a CAN bus interface. Communication interface 92 in this case is directly connected to host 82, but may, for example, also be connected to bus 90.

Multiple or also all of the individual parts (host 82, HSM 84, memory 86, communication interface 92) may be integrated in one chip. The control unit may include further components not shown.

Figure 2:
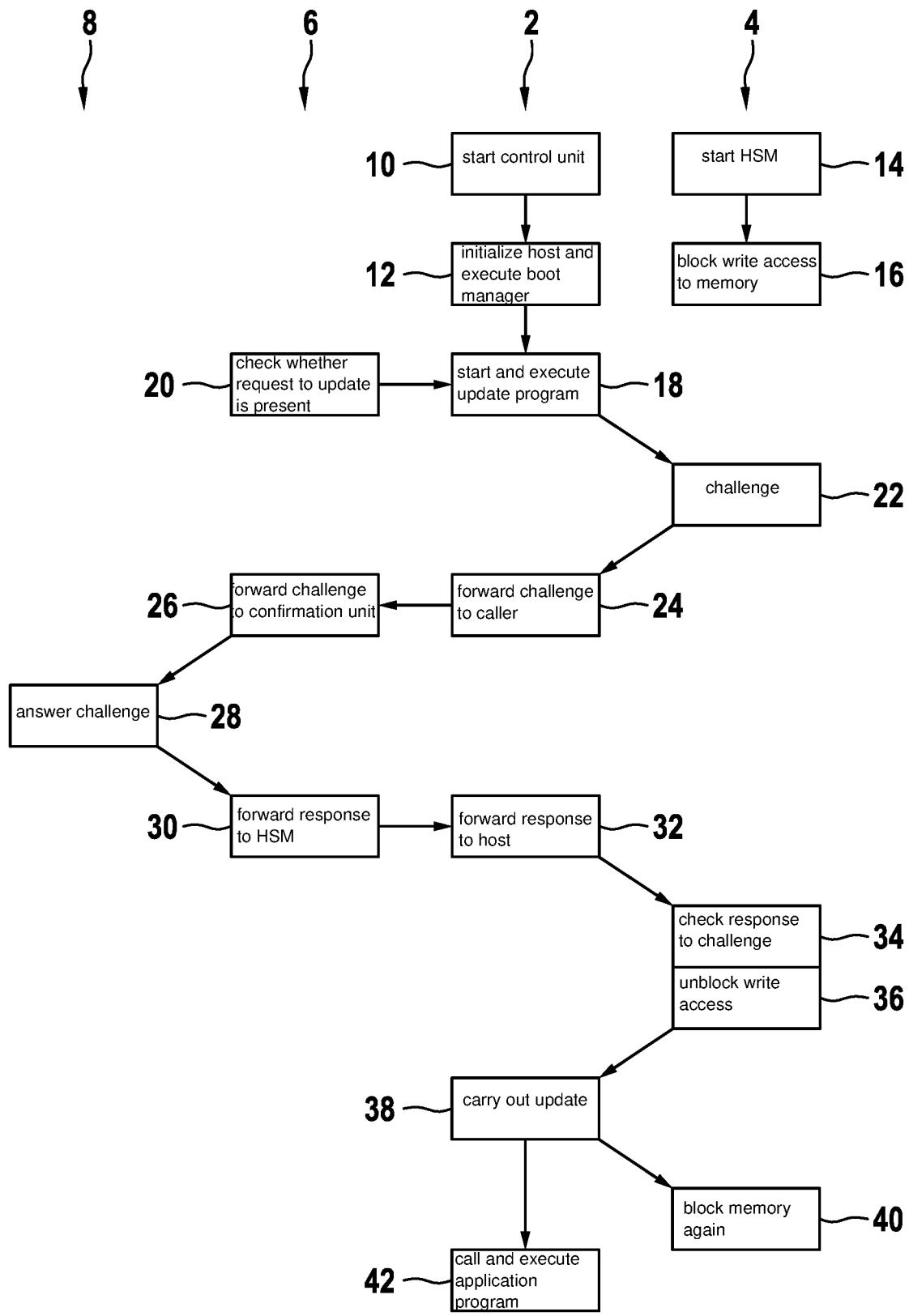
FIG. 2 shows an overview of the basic structure of one preferred specific example embodiment of the method for securely updating a control unit.

An overview of the basic sequence according to one preferred embodiment of the update method is shown in FIG. 2. Processes corresponding to a user of the method are each represented in one column in the figure. These are: processes 2, which run on the side of a host, processes 4, which run on the side of an HSM, processes 6, which run on the side of a caller, and processes 8, which run on the side of a confirmation unit as a reliable third body. The arrangement of the shown elements in the vertical direction of the figures corresponds roughly to the temporal sequence, smaller variations between steps on the host side on the one hand and steps on the HSM side on the other hand being possible. This means, it is possible that processes situated at identical vertical heights take place at different points in time, or processes situated at different heights proceed simultaneously or in reverse sequence, as long as this is consistent with the logical sequence of the method, for example, temporal shifts may occur during the startup and during the initialization of the host and of the HSM. For example, step 16 (blocking the write access, see above) could be carried out before step 12 (initialization of the host), even if these two steps are represented at the same height; on the other hand, (consistent with the logical sequence of the method), step 38 (carrying out the update) may always be carried out only after step 36 (unblocking the write access), in this case therefore, no change in the order shown is possible.

The host starts up in block or step 10 when the control unit is started up, for example, when the control unit is switched on. In this case, the host is initialized, in particular, in step 12 and a boot manager, for example, is executed. The HSM also starts up in step 14, the HSM blocking the write access to the memory in step 16.

Once the host is initialized in step 12, the update program is started and executed by the host in step 18. The update program checks whether a request 20 by a caller to carry out an update is present. If this is the case, the HSM is requested to remove the write protection. For this purpose, the HSM initially checks the authorization of the caller to carry out an update with the aid of a challenge-response authentication method.

In particular, a challenge (or question) is posed to the caller by the HSM in step 22 whether the caller has knowledge of a secret, for example, of a secret key, the knowledge of which is required for responding to the challenge. This challenge is forwarded in step 24 from the host to the caller (since the HSM is unable to communicate directly with the outside world). The caller, not being in direct possession of the response itself, forwards the challenge in step 26 in turn to the confirmation unit.

The confirmation unit, which is in possession of the response or of the secret, answers the challenge in step 28. The response is forwarded back to the HSM in steps 30, 32 via the caller and the host. This entire communication chain proceeds preferably in an encrypted or cryptologically secured form. In the challenge-response method, it is possible, for example, to use symmetrical methods (i.e., confirmation unit and HSM know a shared secret) or asymmetrical methods (i.e., only the confirmation unit knows the secret and the HSM is able to check this, but does not know the secret itself).

In the case of a control unit of a motor vehicle, there are, for example, many different potential callers (auto repair shops or their employees), for uploading a control unit update. According to the specific embodiment of FIG. 2, it is not necessary to distribute the secret to this multitude of potential callers. In this method, the caller is required to identify itself to the confirmation unit. This occurs, for example, with the aid of a hardware token, for example, a smartcard, with which the caller is able to prove its identity to the confirmation unit, for example, with the aid of a digital certificate stored on the hardware token. An advantage of this approach is that if the hardware token is compromised, for example, is stolen, the hardware token is required to be declared invalid at only one location, namely in the confirmation unit.

The returned response to the challenge is checked by the HSM in step 34 and, if the response is correct, the write access to the memory is unblocked by the HSM in step 36.

The execution of the update program is subsequently continued by the host, i.e., the update is carried out in step 38, which includes, in particular, a rewriting of at least a portion of the memory. The memory is subsequently blocked again by the HSM in step 40 and an application program is called up and executed in step 42, i.e., the actual function of the control unit is called up.

Figure 3:
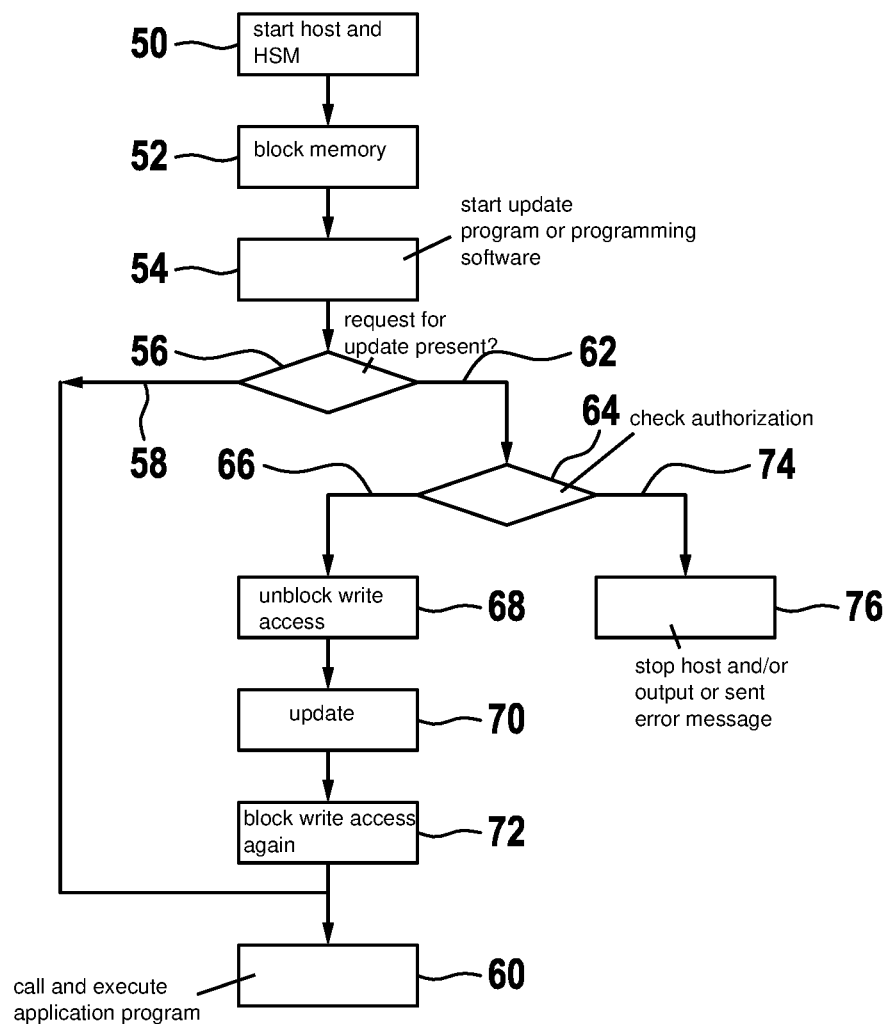
FIG. 3 shows a flowchart of one preferred specific example embodiment of the method according to the present invention.

FIG. 3 represents a flowchart of one preferred specific embodiment of the method according to the present invention. The host and the hardware security module (HSM) are initially started up in step 50. These usually call up in each case a loader program (boot manager or boot loader) and carry out an initialization. After initialization, programs or software stored by the loader program of the host in the memory are called up. After the startup or during the startup phase, the write access to the memory is blocked by the HSM in step 52. If the write access is blocked, the memory is unable to be written either with software or with data, a reprogramming or update is not possible at this point in time.

After the initialization of the host, an update program or a programming software is started in step 54. The update program determines in step 56 whether a request of a caller to carry out an update of the control unit is present. If such a request is not present, arrow 58, an application program is preferably called up and executed in step 60.

If, on the other hand, a request to carry out an update is present, arrow 62, an authorization check is carried out by the HSM in step 64. In the authorization check, it is checked whether the caller is authorized to carry out an update of the control unit, i.e., a rewriting of at least a portion of the memory. The authorization check takes place, preferably using a challenge-response method, further preferably using the challenge-response method presented with the description of FIG. 2.

If it is established that the caller is authorized, arrow 66, the write access to the memory is unblocked by the HSM in step 68. The execution of the update program is subsequently continued, via which the update of the control unit is carried out in step 70, in particular, at least a portion of the memory being rewritten. Upon completion of the update, the write access to the memory is blocked again by the HSM in step 72 and the application program is subsequently called up and executed (step 60).

If, on the other hand, it is established that the caller is not authorized, arrow 74, the host is preferably stopped in step 76 and/or an error message is output and/or sent.

What is claimed is:

1. A method for securely updating a control unit, which includes a host that is configured to execute an update program and at least one application program, a memory, which contains programs and data, and a hardware security module (HSM) configured to block and to unblock a write access to the memory, the method comprising the following steps:
    starting the host and the HSM, wherein the control unit including the host, the memory, and the HSM, is situated in a vehicle;
    blocking, by the HSM, the write access to the memory;
    starting the update program;
    determining by the update program whether a request of a caller to carry out an update is present;
    determining the request to the present, and based on the request being present, checking by the HSM, an authorization of the caller to carry out the update, the authorization of the caller being confirmed by a confirmation unit including a computer processor, wherein the confirmation unit is external to the vehicle, wherein the caller identifies itself to the confirmation unit, the HSM checking the authorization using a challenge-response authentication, the HSM issuing a challenge, and the confirmation unit confirming the authorization to the HSM by responding to the issued challenge with a response; and
    establishing during the check of the authorization that the caller is authorized, and unblocking, by the HSM, the write access to the memory and re-writing at least a portion of the memory by the update program.

2. The method as recited in claim 1, further comprising, after the starting of the update program, executing at least one of the at least one application program by the host when no request is present.

3. The method as recited in claim 1, where, when it is established during the check of the authorization that the caller is authorized, blocking, by the HSM, the write access to the memory after the rewriting and subsequently executing at least one of the at least one application program by the host.

4. The method as recited in claim 1, further comprising: requesting and checking a password before unblocking the write access to the memory.

5. The method as recited in claim 1, further comprising: stopping the host and/or sending or outputting an error message, when it is established that the caller is not authorized.

6. The method as recited in claim 1, wherein the caller identifies itself to the confirmation unit using a hardware token.

7. The method as recited in claim 1, wherein the caller identifies itself to the confirmation unit using a smart card with the aid of a digital certificate stored on the smart card.

8. The method as recited in claim 1, wherein the confirmation unit includes a server or a distributed system.

9. The method as recited in claim 1, wherein the confirmation unit includes a distributed system in the form of a Public Key Infrastructure or a blockchain.

10. The method as recited in claim 1, wherein the confirmation unit stores code words or cryptographic keys which are used in the authorization check.

11. The method as recited in claim 1, wherein the HSM forwards the challenge to the host, and the host communicates the challenge to the confirmation unit via a communication interface of the host.

12. A processing unit including a computer configured for securely updating a control unit, which includes a host that is configured to execute an update program and at least one application program, a memory, which contains programs and data, and a hardware security module (HSM) configured to block and to unblock a write access to the memory, the processing unit configured to:
    start the host and the HSM, wherein the control unit including the host, the memory, and the HSM, is situated in a vehicle;
    block, by the HSM, the write access to the memory;
    start the update program;
    determine by the update program whether a request of a caller to carry out an update is present;
    determine the request to be present, and based on the request being present, check by the HSM of an authorization of the caller to carry out the update, the authorization of the caller being confirmed by a confirmation unit including a computer processor, wherein the confirmation unit is external to the vehicle, wherein the caller identifies itself to the confirmation unit, the HSM checking the authorization using a challenge-response authentication, the HSM issuing a challenge, and the confirmation unit confirming the authorization to the HSM by responding to the issued challenge with a response; and
    based on establishing during the check of the authorization that the caller is authorized, unblock, by the HSM, the write access to the memory and re-writing at least a portion of the memory by the update program.

13. A non-transitory machine-readable memory medium on which is stored a computer program for securely updating a control unit, which includes a host that is configured to execute an update program and at least one application program, a memory, which contains programs and data, and a hardware security module (HSM) configured to block and to unblock a write access to the memory, the computer program, when executed by a computer processor, causing the computer processor to perform the following steps:
    starting the host and the HSM, wherein the control unit including the host, the memory, and the HSM, is situated in a vehicle;
    blocking, by the HSM, the write access to the memory;
    starting the update program;

determining by the update program whether a request of a caller to carry out an update is present;

determining the request to be present, and based on the request being present, checking by the HSM, an authorization of the caller to carry out the update, the authorization of the caller being confirmed by a confirmation unit including a computer processor, wherein the confirmation unit is external to the vehicle, wherein the caller identifies itself to the confirmation unit, the HSM checking the authorization using a challenge-response authentication, the HSM issuing a challenge, and the confirmation unit confirming the authorization to the HSM by responding to the issued challenge with a response; and based on establishing during the check of the authorization that the caller is authorized, unblocking, by the HSM, the write access to the memory and re-writing at least a portion of the memory by the update program.

* * * * *